United States Patent [19]

Fujii et al.

[11] Patent Number: 4,462,351

[45] Date of Patent: Jul. 31, 1984

[54] SPLIT TYPE INTERNAL COMBUSTION ENGINE

[75] Inventors: Hiroshi Fujii; Sigeru Kamegaya, both of Tokyo, Japan

[73] Assignee: Nissan Motor Company, Limited, Yokohama, Japan

[21] Appl. No.: 467,906

[22] Filed: Feb. 18, 1983

[30] Foreign Application Priority Data

Feb. 25, 1982 [JP] Japan .................. 57-29174

[51] Int. Cl.³ ............................................ F02D 17/02
[52] U.S. Cl. ................................ 123/198 F; 123/481; 123/571
[58] Field of Search ...................... 123/198 F, 481, 571

[56] References Cited

U.S. PATENT DOCUMENTS

| 4,201,180 | 5/1980 | Iizuka | 123/198 F |
| 4,249,374 | 2/1981 | Sugasawa et al. | 123/198 F |
| 4,303,053 | 12/1981 | Etoh et al. | 123/568 |
| 4,320,726 | 3/1982 | Etoh et al. | 123/198 F |
| 4,337,740 | 7/1982 | Sugasawa et al. | 123/198 F |
| 4,344,393 | 8/1982 | Etoh et al. | 123/198 |
| 4,398,520 | 8/1983 | Schulz et al. | 123/198 F |
| 4,411,228 | 10/1983 | Sugasawa | 123/198 F |

OTHER PUBLICATIONS

Hartig, Fritz et al., "Die BMW-Zylinderabschaltung", Automobiltechnische Zeitschrift 83 (1981), pp. 69-73.

Primary Examiner—Ira S. Lazarus
Attorney, Agent, or Firm—Schwartz, Jeffery, Schwaab, Mack, Blumenthal & Koch

[57] ABSTRACT

An internal combustion engine comprises an induction passage divided downstream of a throttle valve into two intake passages respectively communicating with first and second cylinder units, and an EGR passage connected from the engine exhaust to the induction passage downstream of the throttle valve. The EGR passage has therein an EGR valve whose position determines the flow area for exhaust gases through the EGR passage. A control unit disables the second cylinder unit to shift the engine from full engine operation into split engine operation when the engine load falls below a predetermined value. The control unit comprises a computer including at least two read only memories, the first storing EGR ratio values arranged in relation with engine speed and load for the engine being in full engine operation. The second read only memory stores EGR ratio values arranged in relation with engine speed and load for the engine being in split engine operation. The computer is responsive to engine speed and load conditions for reading out an optimum EGR ratio value from the first read only memory when the engine is in full engine operation or from the second read only memory when the engine is in split engine operation. The position of the EGR valve is controlled in accordance with the read out EGR ratio value.

9 Claims, 12 Drawing Figures

FIG.2
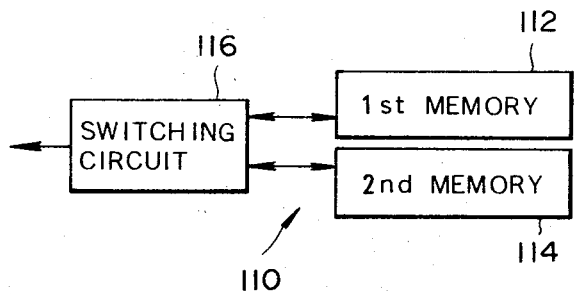
FIG.3
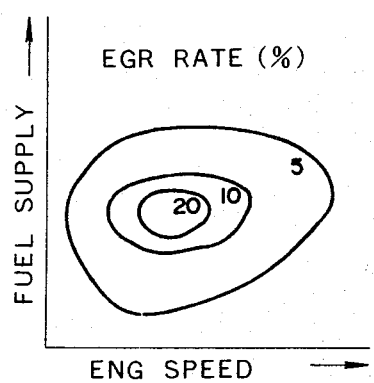
FIG.4
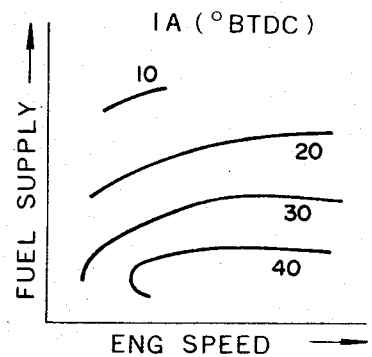
FIG.5
| | SPLIT ENGINE OPERATION | FULL ENGINE OPERATION |
|---|---|---|
| SPARK ADVANCE (°BTDC) | 38° | 28° |
| EGR RATE | 5.1 % | 15.5 % |
| MANIFOLD PRESSURE | −421 mmHg | −161 mmHg |

SPLIT TYPE INTERNAL COMBUSTION ENGINE

BACKGROUND OF THE INVENTION

The present invention relates to improvements in a split type multicylinder internal combustion engine operable on less than all of its cylinders when the engine load is below a given value.

It is known that to increase the efficiency of a multicylinder internal combustion engine, the number of cylinders on which the engine operates under predetermined engine operating conditions can be reduced, particularly under conditions of low engine load. For this purpose, control means are provided which disable a number of cylinders in a multicylinder internal combustion engine by blocking the flow of air-fuel mixture to disabled cylinders under low load conditions. The disablement of some of the cylinders of the engine increases the load on those remaining in operation and, as a result, the energy conversion efficiency is increased. It is common practice in automotive vehicle engines to suppress maximum combustion temperature so as to minimize NOx production in the cylinders by introducing exhaust gases into the engine intake manifold under intake manifold vacuum. For such split type engines, however, it has been found extremely difficult to maintain an EGR ratio optimum to minimize the emission from the engine of noxious pollutants since the intake manifold vacuum varies according to the engine being in full or split engine operation.

The present invention provides an improved split type multicylinder internal combustion engine wherein accurate EGR ratio control is made over the entire engine operating range to aid in the reduction of exhaust emissions.

SUMMARY OF THE INVENTION

There is provided, in accordance with the present invention, an internal combustion engine comprising first and second cylinder units each including at least one cylinder, an induction passage having therein a throttle valve, and an exhaust passage. The induction passage is divided downstream of the throttle valve into first and second intake passages respectively communicating with the first and second cylinder units. The second intake passage has a stop valve near its entrance. An EGR passage is connected from the exhaust passage to the induction passage downstream of the throttle valve. The EGR passage has therein an EGR valve whose position determines the flow area for exhaust gases through the EGR passage. The engine also comprises a control unit for closing the stop valve and disabling the second cylinder unit to shift the engine from full engine operation to split engine operation when the engine load falls below a predetermined value. The control unit comprises a computer responsive to signals indicative of engine speed and engine load. The computer includes read only memory means having first and second tables, the first table storing signals with values indicative of EGR ratio as functions of engine load and engine speed for the engine being in full engine operation. The second table stores signals with values indicative of EGR ratio as functions of engine load and engine speed for the engine being in split engine operation. The computer is operable to select a signal having a value indicative of EGR ratio.

Preferably, the computer includes additional read only memory means having third and fourth tables, the third table storing signals with values indicative of spark advance as functions of engine load and engine speed for the engine being in full engine operation. The fourth table stores signals with values indicative of spark advance as functions of engine load and engine speed for the engine being in split engine operation. In this case, the computer is operable to select a signal having a value indicative of spark advance corresponding with the conditions of engine load and engine speed from the third table when the engine is in full engine operation or from the fourth table when the engine is in split engine operation. The occurrence times of sparking for each cylinder of the engine is controlled in accordance with the selected signal having a value indicative of spark advance.

Additional objects, advantages and novel features of the invention will be set fourth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

BRIEF DESCRIPTION OF THE DRAWINGS

The present invention will be described in greater detail by reference to the following description taken in connection with the accompanying drawings, in which:

FIG. 2 is a schematic block diagram showing a part of the control unit associated with the engine;

FIGS. 3 and 4 are representations of the loci of the predetermined EGR ratio and spark advance values produced during full engine operation;

FIG. 5 is a table showing predetermined EGR ratio and spark advance values for full engine operation and predetermined EGR ratio and spark advance values for split engine operation under the same conditions of engine speed and output torque;

DESCRIPTION OF THE PREFERRED EMBODIMENTS

Figure 1:
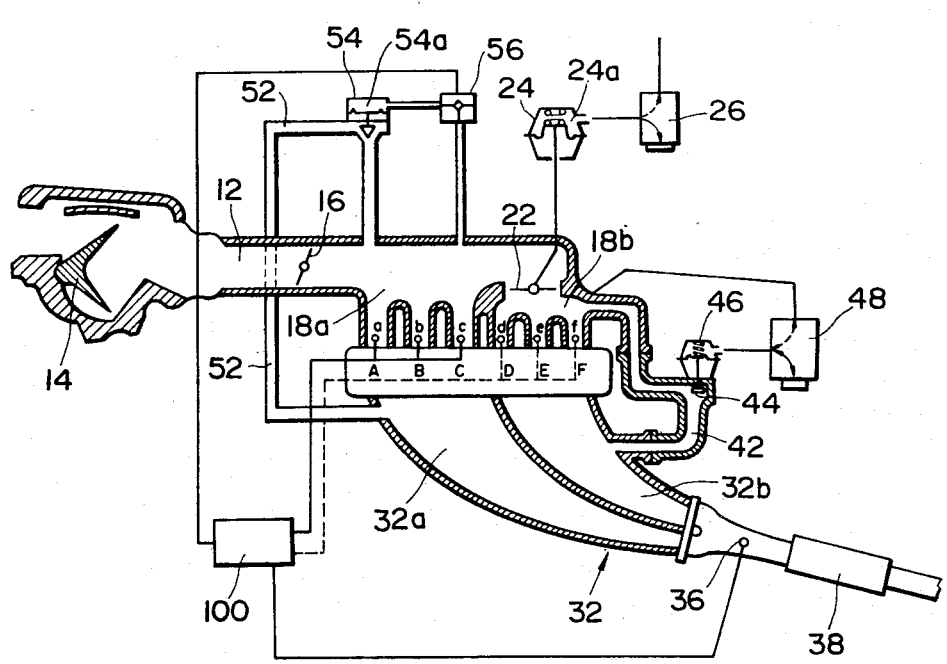
FIG. 1 is a schematic sectional view showing one embodiment of a split type multicylinder internal combustion engine made in accordance with the present invention.

Referring now to FIG. 1, there is illustrated one embodiment of a split type multicylinder internal combustion engine made in accordance with the present invention. The engine is shown as a 6-cylinder engine having an engine block 10 which contains two cylinder units, the first including three cylinders A, B and C which are always active by the supply of fuel through respective fuel injectors a, b and c during engine operation. The second cylinder unit includes three cylinders D, E and F which is maintained active by the supply of fuel through respective fuel injectors d, e and f except under low load conditions. Under low load conditions, the fuel injectors d, e and f become inoperative to interrupt the supply of fuel to the cylinders D, E and F and thereby disable these cylinders.

Air to the engine is introduced through an induction passage 12 provided therein with an air flow meter 14 and a throttle valve 16. The air flow meter 14 is responsive to the flow of air to produce a signal corresponding thereto which is applied to a control unit to be described later. The throttle valve 16 is drivingly connected to the accelerator pedal (not shown) for controlling the flow of air to the engine. The induction passage 12 is connected downstream of the throttle valve 16 to an intake manifold 18 which is divided into first and second intake passages 18a and 18b. The first intake passage 18a leads to the cylinders A, B and C and the second intake passage 18b leads to the cylinders D, E and F.

The second intake passage 18b has at its entrance a stop valve 22 which is operable to interrupt communication between the induction passage 12 and the second intake passage 18b, thereby blocking the supply of fresh air to the cylinders D, E and F when it is closed. The stop valve 22 is driven by a first pneumatic valve actuator 24 which may be of the type having a diaphragm spread within a casing to define therewith two chambers on the opposite sides of the diaphragm, and an operating rod movable to open and close the stop valve 22 with the displacement of the diaphragm. The working chamber 24a is connected to an outlet port of a first three-way solenoid valve 26 which has two inlet ports, the first opening to atmospheric air and the second communicating with a vacuum source (not shown). The first solenoid valve 26 is connected to a control unit 100 which generates a control signal when the engine load is below a predetermined value. Under high load conditions, the first solenoid valve 26 is in a position providing communication between its outlet port and its first inlet port to introduce atmospheric pressure to the actuator working chamber 24a, thereby opening the stop valve 22. When the control signal appears on the first solenoid valve input, the first solenoid valve 26 moves to another position where communication is established between its output port and its second inlet port to introduce vacuum from the vacuum tank to the actuator working chamber 24a, thereby closing the stop valve 22.

The engine also has an exhaust manifold 32 which is divided into first and second exhaust passages 32a and 32b. The first exhaust passage 32a leads from the cylinders A, B and C, and the second exhaust passage 32b leads from the cylinders E, F and G. The exhaust manifold 32 is connected at its downstream end to an exhaust duce 34 wherein there are provided an air/fuel ratio sensor 36 and an exhaust gas purifier 38. The air/fuel ratio sensor may be taken in the form of an oxygen sensor which provides a feedback signal from the engine exhaust to the control unit 100 to ensure that the fuel supplied to the engine is correct to maintain a desired optimum air/fuel ratio. The exhaust gas purifier 38 may be in the form of a three-way catalytic converter which effects oxidation of HC and CO and reduction of NOx so as to minimize the emission of pollutants through the exhaust duct 34.

The second exhaust passage 32b is connected to the second intake passage 18b through an exhaust gas recirculation (EGR) passage 42 having therein an EGR valve 44. When it is open, the EGR valve 44 permits a relatively great amount of exhaust gases to recirculate through the EGR passage 32 into the second intake passage 18b, thereby maintaining the second intake passage 18b near but below the atmospheric pressure. This is effective to minimize pumping losses in the disabled cylinders D, E and F during a split engine mode of operation wherein the stop valve 22 closes, as described hereinbefore. The EGR valve 44 closes to prevent exhaust gas recirculation during a full engine mode of operation wherein the engine operates on all of the cylinders A to F.

The EGR valve 44 is driven by a second pneumatic valve actuator 46 which is substantially similar to the first valve actuator 24. The working chamber 46a of the second valve actuator 46 is connected to an outlet port of a second three-way solenoid valve 48 which has a first inlet port opening to atmospheric air and a second inlet port communicating with the second intake passage 18b or another vacuum source (not shown). The second solenoid valve 48 has an input coupled to the control signal from the control unit 100. In the absence of the control signal, the second solenoid valve 48 is in a position providing communication between its outlet port and its first inlet port to introduce atmospheric pressure to the actuator working chamber 46a, thereby closing the EGR valve 44. When the control signal appears on the second solenoid valve input, the second solenoid valve 48 moves to another position where communication is established between its outlet port and its second inlet port to introduce vacuum from the second intake passage 18b into the actuator working chamber 46a so as to open the EGR valve 44.

The first exhaust passage 32a is connected to the induction passage 12 downstream of the throttle valve 16 through an EGR passage 52 having therein an EGR ratio control valve 54 whose position determines the EGR ratio, that is, the ratio between the amount of exhaust gases recirculated through the EGR passage 52 and the amount of air to the engine. Such exhaust gas recirculation is effective to suppress maximum combustion temperature in each cylinder, thereby minimizing the emission from the engine of noxious pollutants. The EGR ratio control valve 54 has a working chamber 54a communicating with an outlet port of a third three-way solenoid valve 56 which has a first inlet port opening into atmospheric air and a second inlet port communicating with the induction passage 12 downstream of the throttle valve 16 or another vacuum source. The third solenoid valve 56 has an input connected to the control unit 100 which generates a command signal whose pulse width or duty cycle determines the ratio between the time its output port communicates with its first inlet port and the time its outlet port communicates with its second inlet port to control the degree of vacuum to the control valve working chamber 54a and thus the position of the EGR ratio control valve 54. Thus, the EGR ratio is determinative on the pulse width or duty cycle of the command signal from the control unit 100.

The control unit 100 generates a fuel-injection pulse signal which is divided into two paths, the first leading to the fuel injectors a, b and c. The second path for the fuel-injection pulse signal includes a switching means (not shown) and leads to the fuel injectors d, e and f. The amount of fuel metered to each cylinder, this being determined by the pulse width or duty cycle of the fuel-injection pulse signal applied to the associated fuel injector, is primarily determined by the sensed conditions of engine load, as inferred from measurement of air flow in the induction passage 12, and engine speed in terms of engine crankshaft speed, but modified by the sensed oxygen content in the engine exhaust to ensure that the fuel supplied to the engine is correct to maintain a desired (usually stoichiometric) air-fuel ratio.

When the sensed engine load, as inferred from measurement of air flow in the induction passage, is below a predetermined value, the control unit 100 generates a control signal to the first solenoid valve 26 which thereby closes the stop valve 22 and also to the second solenoid valve 48 which thereby opens the EGR valve 44 and the control unit 100 further causes the switching means to block the flow of the fuel-injection pulse signal to the fuel injectors d, e and f, thereby disabling the cylinders D, E and F. During such split engine operation, the cylinders A, B and C is supplied with fresh air in amounts two times greater than in normal engines for the same engine load since the entire amount of fresh air introduced through the induction passage 12 is directed to the first intake passage 18a and hence to the cylinders A, B and C by the closure of the stop valve 22. It is, therefore, necessary to double the amount of fuel to be supplied through the fuel injectors a, b and c into the cylinders A, B and C during split engine operation. For this purpose, the control unit 100 is designed to change the constant used in calculating the amount of fuel required for each cylinder to a value double the value for full engine operation.

Since the amount of fuel supplied into each cylinder and thus the burning velocity therein vary according to the specific mode of operation of the engine, the ignition system spark timing is controlled depending upon whether the engine is in full or split engine operation to achieve maximum energy conversion efficiency. In addition, the vacuum in the induction passage 12 downstream of the throttle valve 16 varies according to the specific mode of operation of the engine. In full engine operation where the individual cylinder load is relatively small, an increased amount of exhaust gases is drawn through the EGR passage 52 into the induction passage 12; however, in split engine operation where the individual cylinder load is relatively great, a decreased amount of exhaust gases is drawn through the EGR passage 52 into the induction passage 12. Thus, the EGR valve position is controlled depending upon whether the engine is in full or split engine operation to achieve minimized NOx production.

In the control unit 100, the EGR-valve position and the spark timing are repetitively determined from arithmetic calculations performed by a digital computer which shall be regarded as including an analog multiplexer, an analog-to-digital converter, a central processing unit, and a memory. As shown in FIG. 2, the memory 110 includes first and second memory sections 112 and 114 one of which is selected for use with the digital computer by a switching circuit 116 depending upon whether the engine is in its full or split engine operation.

The first memory section 112 includes read only memory means having tables for storing signals with values indicative of EGR ratio (%) and spark advance (degrees before the top dead center position) as functions of fuel supply to each cylinder and engine speed for the engine being in full engine operation as shown in FIGS. 3 and 4. The second memory section 114 includes read only memory means having tables for storing signals with values indicative of EGR ratio and spark advance as functions of fuel supply to each cylinder and engine speed for the engine being in split engine operation, these tables being similar to those shown in FIGS. 3 and 4 except that the scale of fuel supply to each cylinder are substantially double those in FIGS. 3 and 4.

The operation is as follows: Assuming now that the engine is operating under high load conditions, the control unit 100 provides a fuel-injection pulse signal to the fuel injectors a, b and c and also to the fuel injectors d, e and f so that the engine operates on the cylinders A, B, C, D, E and F all supplied with an adequate amount of fuel through the respective fuel injectors a, b, c, d, e and f. During such full engine operation, the control unit 100 terminates the application of the control signal to the first and second solenoid valves 26 and 48 with the result that the stop valve 22 remains open to permit fresh air to enter the cylinders D, E and F and the EGR valve 44 remains closed to prevent exhaust gases to recirculate through the EGR passage 42. The control unit 100 further forces the switching circuit 116 to select the first memory section 112 which generates output signals representation of optimum values of EGR ratio and spark advance for full engine operation based upon the instantaneous values of both of the amount of fuel supplied into each cylinder and the speed of rotation of the engine as shown in FIGS. 3 and 4. According to these outputted signals, the control unit 100 controls the third solenoid valve 56 to achieve the optimum EGR ratio and the ignition system to achieve the optimum spark advance.

When the engine load falls below a predetermined value, the control unit 100 blocks the flow of the fuel-injection pulse signal to the fuel injectors d, e and f to terminate fuel injections for the cylinders D, E and F and disable these cylinders. Simultaneously therewith, the control unit 100 provides a control signal to the first and second solenoid valves 26 and 48, thereby closing the stop valve 22 to block fresh air flow to the disabled cylinders D, E and F and opening the EGR valve 46 to permit exhaust gases to recirculate through the EGR passage 42 into the disabled cylinder so as to minimize pumping losses therein. The control unit 100 further forces the switching circuit 16 to select the second memory section 114 which generates output signals representation of optimum values of EGR ratio and spark advance for the engine being in split engine operation based upon the instantaneous values of both of the amount of fuel supplied into each cylinder and the speed of rotation of the engine. According to these outputted signals, the control unit 100 controls the third solenoid valve 56 to achieve the optimum EGR ratio and the ignition system to achieve the optimum spark advance.

FIG. 5 shows one example of values to which the spark advance and the EGR ratio are controlled for a 1998 cc, 6-cylinder engine running at a speed of 40 Km/h with the engine speed being about 1400 rpm to about 1600 rpm and the output torque being about 2 Kg.m. As can be seen from the table, the spark advance is set at 38 degrees before the top dead center and the EGR ratio is set at 5.1% during full engine operation, whereas the spark advance is set at 28 degrees before the top dead center and the EGR ratio is set at 15.5% during split engine operation. That is, during full engine operation where both the individual cylinder load (or the mass flow of air) and the fuel supply to each cylinder are relatively small, a greater spark advance is quoted and a smaller EGR ratio is quoted in spite of the fact that the intake manifold pressure is as low as −421 mmHg; however, during split engine operation where both the individual cylinder load and the fuel supply to each cylinder are relatively great, a smaller spark advance is quoted and a greater EGR ratio is quoted in spite of the fact that the intake manifold pressure is as high as −161 mmHg. This is effective to obtain maximum energy conversion efficiency and minimum NOx production.

Although the present invention has been described in connection with a split type engine having an EGR system for recirculating exhaust gases into disabled cylinders to minimize pumping losses therein during split engine operation, it will be appreciated that the invention can be used with other designs of split type engines. For example, such disabled cylinder pumping losses may be minimized by introducing air into the second intake passage 18b during split engine operation as shown in FIG. 6.

Figure 6:
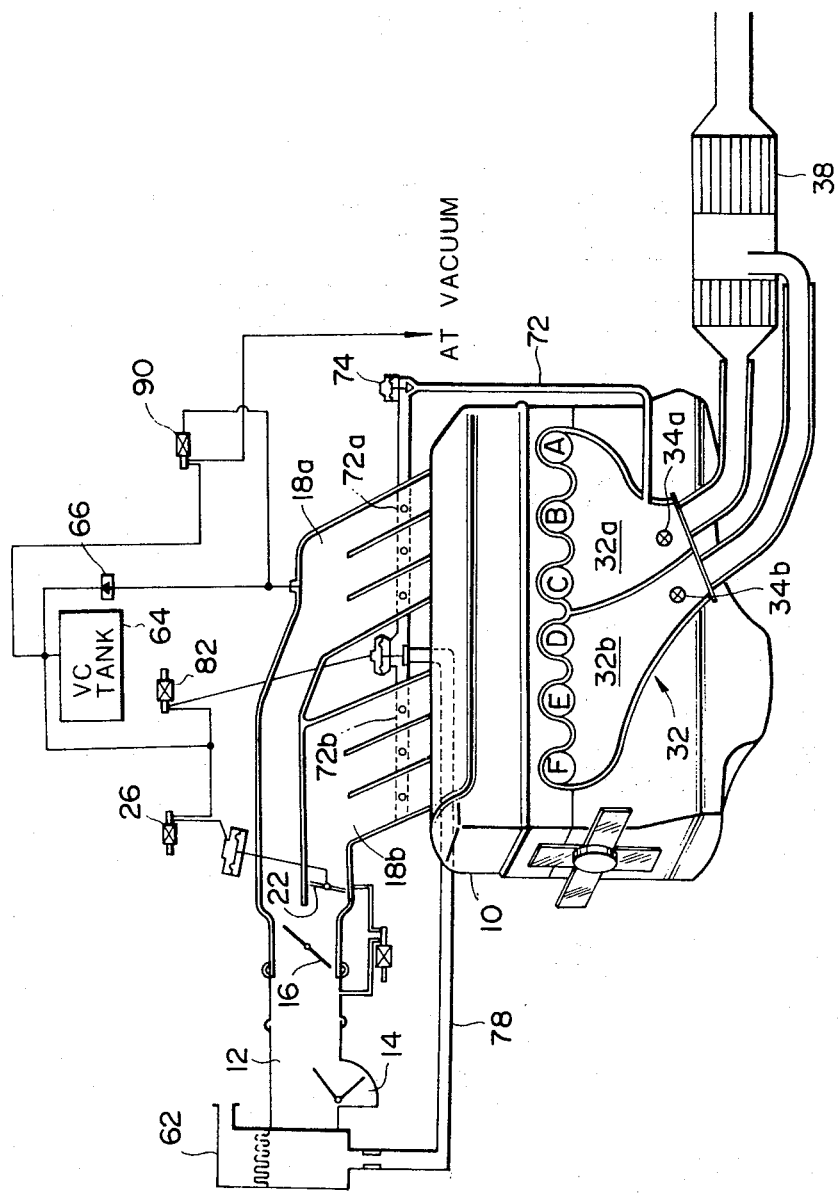
FIG. 6 is a schematic sectional view showing another embodiment of the present invention.

FIG. 6 illustrates another design of split type engine which is identical in many respects to the engine described in connection with FIG. 1, and the same reference numerals are used to identify the equivalent parts. In FIG. 6, air to the engine is introduced through an air cleaner 62 to an induction passage 12 having therein a throttle valve 16 for controlling the flow of air to the engine, and hence through a first intake passage 18a to cylinders A, B and C and also through a second intake passage 18b to cylinders D, E and F. An airflow meter 14 is located in the induction passage 12 upstream of the throttle valve 16. The airflow meter 14 is responsive to the flow of air to produce a signal corresponding thereto which is applied to the control unit 100. The second intake passage 18b has at its entrance a stop valve 22 which closes to block the flow of fresh air to the cylinders D, E and F during split engine operation. The stop valve 22 is driven by a pneumatic valve actuator 24 whose working chamber communicates with a solenoid valve 26. The solenoid valve 26 selectively introduces atmospheric pressure or vacuum from a vacuum tank 64 into the working chamber of the valve actuator 24 to open or close the stop valve 22 in accordance with a command from the control unit 100 in the same manner as described in connection with FIG. 1. The vacuum tank 64 is supplied with vacuum from the first intake passage 18a through a check valve 66.

Exhaust gases from the engine are discharged from an exhaust manifold 32 which has two exhaust passages, the first exhaust passage 32a leading from the cylinders A, B and C and the second exhaust passage 32b leading from the cylinders D, E and F. The first exhaust passage 32a having therein an oxygen sensor 34a and the second exhaust passage 32b having therein an oxygen sensor 34b with a heater. The first and second exhaust passages 32a and 32b are connected to an exhaust purifier 38 through separate front tubes.

The first exhaust passage 32a is connected to an EGR passage 72 having therein an EGR ratio control valve 74. The EGR passage is provided, downstream of the EGR ratio control valve 74, with a change-over valve 76 which is movable between first and second positions. When the change-over valve 76 is in its first position, it divides the EGR passage 72 into two separate portions, the first portion 72a opening into the first intake passage 18a near the inlets of the cylinders A, B and C. The EGR passage second portion 72b opens into the second intake passage 18b near the inlets of the cylinders D, E and F. In the first position of the change-over valve 76, the EGR passage second portion 72b opens into an air passage 78 communicating with the air cleaner 62. When the change-over valve 76 is in its second portion, the EGR passage second portion 72b is connected through the EGR passage first portion 72a to the EGR passage 72, but is disconnected from the air passage 78. The change-over valve 76 has a working chamber communicated with a solenoid valve 82. The solenoid valve 82 selectively introduces vacuum from the vacuum tank 64 or atmospheric pressure into the working chamber of the change-over valve 76 to move the change-over valve 76 to its first or second position in accordance with a command from the control unit 100.

If the engine is used with an automatic transmission, it is preferble to provide a solenoid valve 90 which can selectively apply vacuum from the vacuum tank 64 or vacuum from the first intake passage 18a to the automatic transmission in accordance with a command from the control unit 100.

Figure 7:
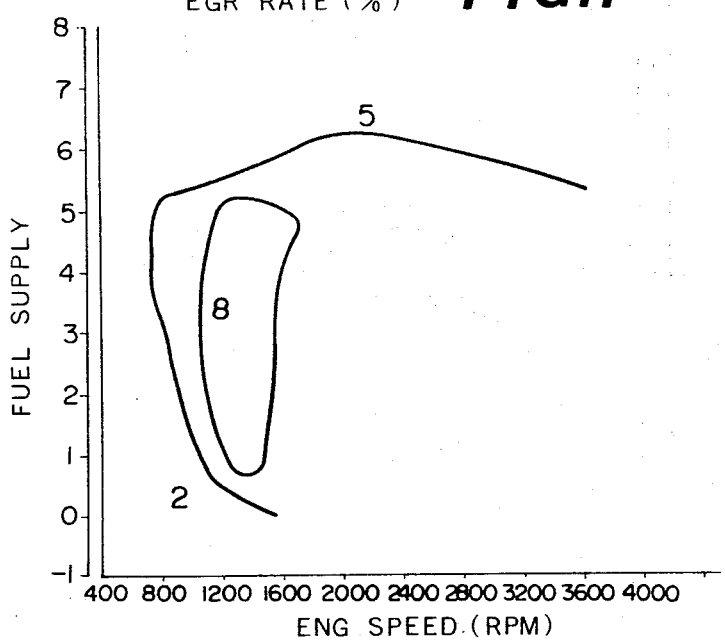
FIGS. 7 and 8 are representations of the loci of the predetermined EGR ratio and spark advance values produced during full engine operation.
Figure 8:
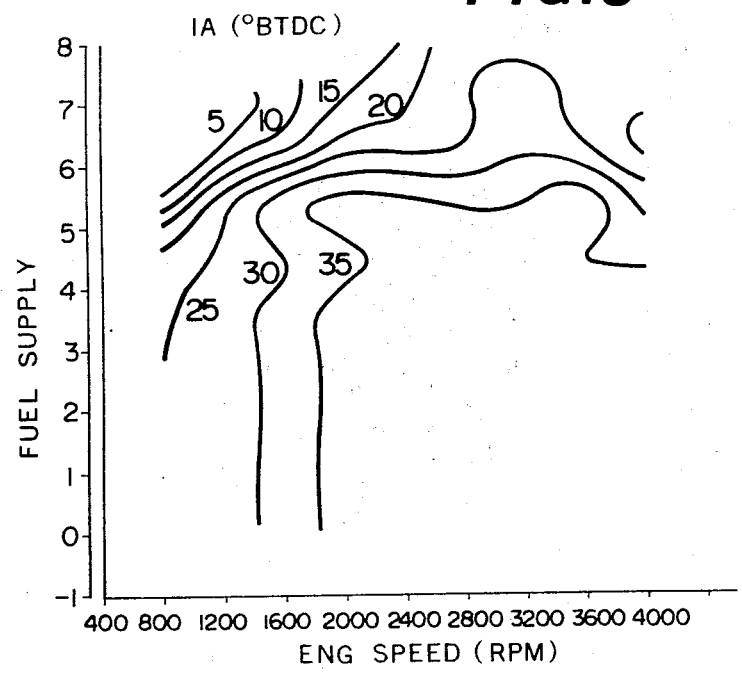
Figure 9:
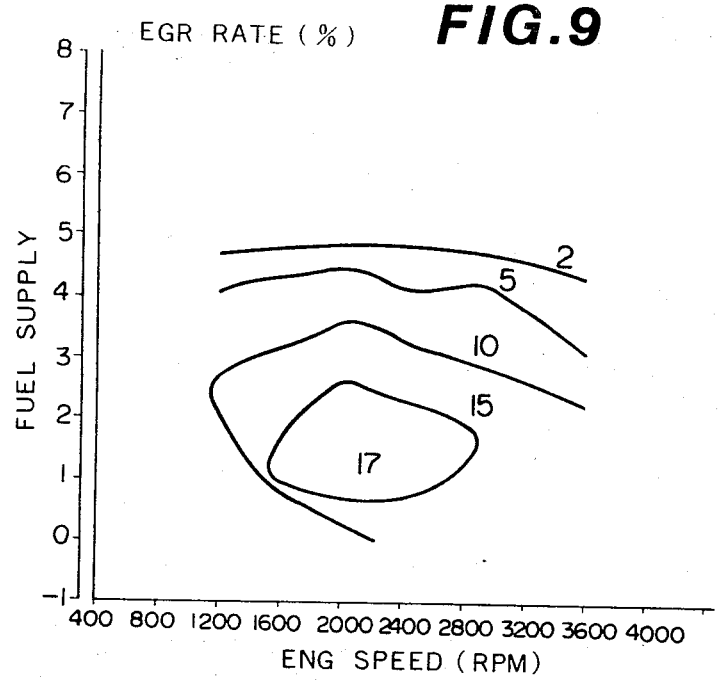
FIGS. 9 and 10 are representations of the loci of the predetermined EGR ratio and spark advance values produced during split engine operation.
Figure 10:
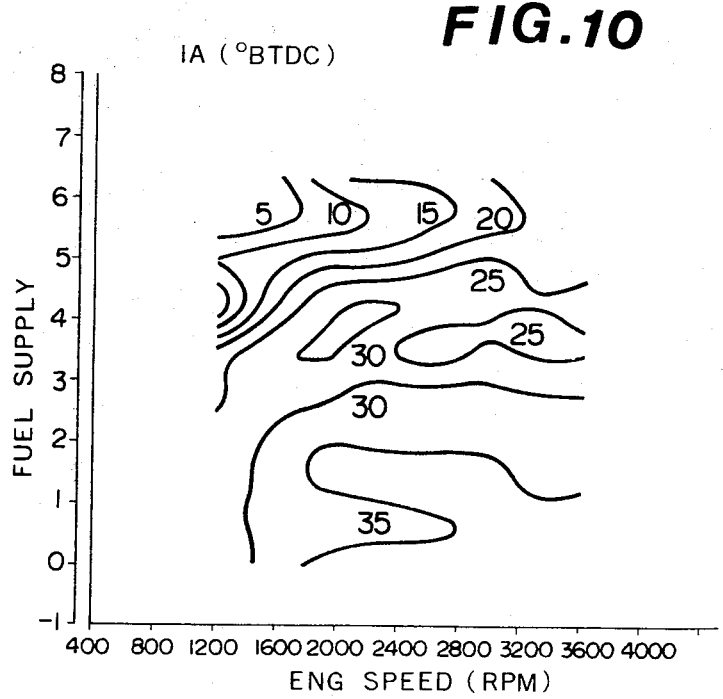

The control unit 100 includes a digital computer which repetively determines optimum values of EGR ratio and spark advance by looking up tables stored in the first and second memory sections 112 and 114 one of which is selected by the switching circuit 116 depending upon whether the engine is in its full or split engine operation. The first memory section 112 includes read only memory means having tables for storing signals with values indicative of EGR ratio and spark advance as functions of fuel supply to each cylinder and engine speed for the engine being in full engine opertion as shown in FIGS. 7 and 8. The second memory section 114 includes read only memory means having tables for storing signals with values indicative of EGR ratio and spark advance as functions of fuel supply to each cylinder and engine speed for the engine being in split engine operation as shown in FIGS. 9 and 10.

When the engine is operating under high load conditions, the control unit 100 provides a fuel-injection pulse signal to all fuel injectors so that the engine operates on the cylinders A to F all supplied with an adequate amount of fuel through the respective fuel injectors. During such full engine operation, the control unit 100 provides a command to the solenoid valve 26 which thereby opens the stop valve 22 and also to the solenoid valve 82 which thereby moves the change-over valve 76 to its second position connecting the EGR passage second portion 72b to the EGR passage first portion 72a and disconnecting the EGR passage second portion 72b from the air passage 78. The control unit 100 further forces the switching circuit 116 to select the first memory section 112 which generates output signals representation of optimum values of EGR ratio and spark advance for full engine operation upon the instantaneous values of both of fuel supply to each cylinder and engine speed as shown in FIGS. 7 and 8. According to these outputted signals, the control unit 100 controls the EGR ratio control valve 74 to achieve the optimum EGR ratio and the ignition system to achieve the optimum spark advance.

When the engine load falls below a predetermined value, the control unit 100 terminates fuel injections for the cylinders D, E and F and disables these cylinders. Simultaneously therewith, the control unit 100 provides a command to the solenoid valve 26 which thereby closes the stop valve 22 and also to the solenoid valve 82 which thereby moves the change-over valve 76 to its first position disconnecting the EGR passage second portion 72b from the EGR passage first portion 72a and connecting the EGR passage second portion 72b to the air passage 78 to introduce air into the second intake passage 18b so as to minimize pumping losses in the disabled cylinders D, E and F. The control unit 100 further forces the switching circuit 116 to select the second memory section 114 which generates output signals representation of optimum values of EGR ratio and spark advance for the engine being in split engine operation based upon the instantaneous values of both of the fuel supply to each cylinder and engine speed as shown in FIGS. 9 and 10. According to these outputted signals, the control unit 100 controls the EGR ratio control valve 74 to achieve the optimum EGR ratio and the ignition system to achieve the optimum spark advance.

Figure 11:
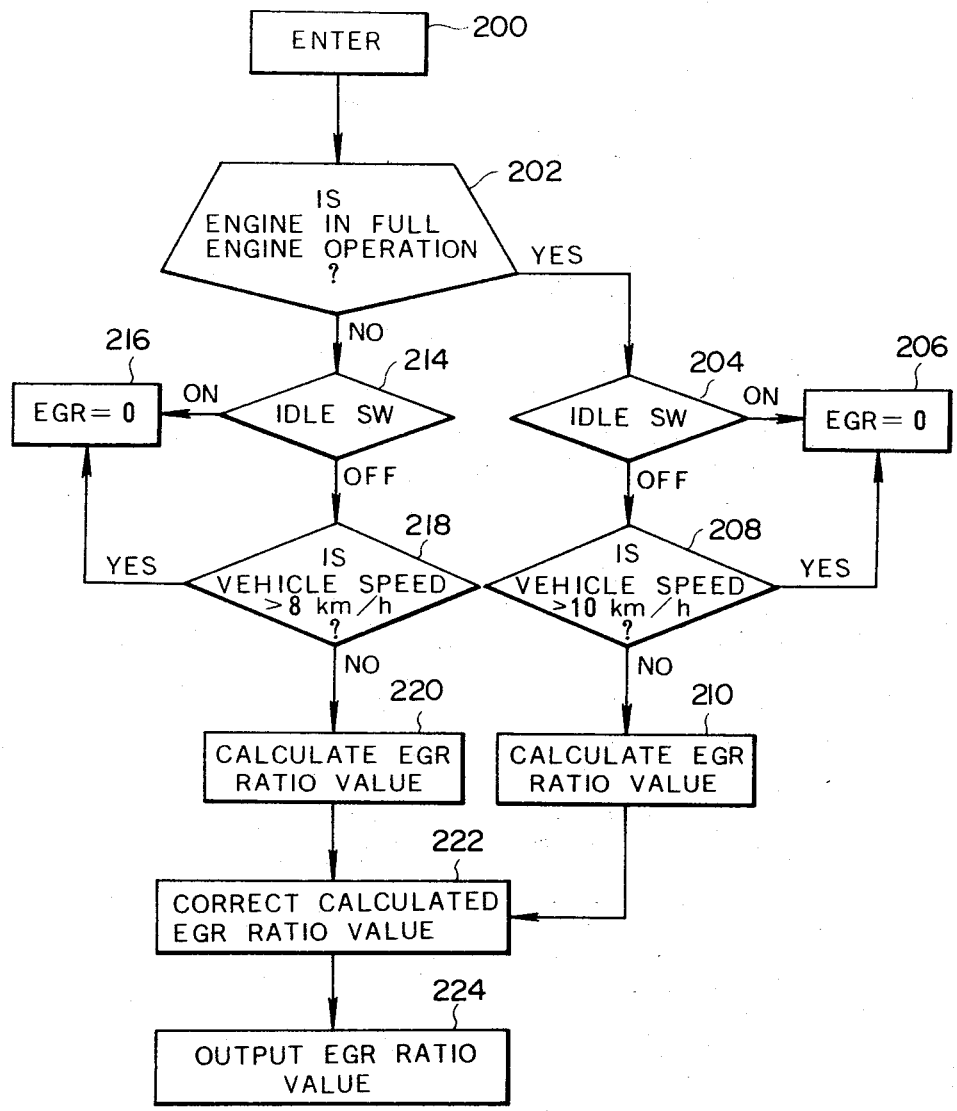
FIG. 11 is a flow diagram illustrating the programming of the digital computer as it is used to control the EGR ratio for the engine.

FIG. 11 is a flow diagram for the digital computer as programmed for the arithmetic calculation of EGR ratio. At the point 200 in FIG. 11, the computer program is entered. At the point 202, a determination is made as to whether the engine is in full engine operation. To make this determination, the computer looks at the instantaneous engine load and determines if this value is greater than a predetermined value. If the answer to this question is "yes", then the engine is operating on all of the cylinders and the program proceeds to another determination at the point 204. This determination is whether or not the idle switch is ON. If the idle switch is ON, then the throttle position is at an angle less than a fixed value, for example 6° open and the EGR ratio is set at the point 206 to 0%. If the idle switch is OFF, then at the point 208, another determination is made as to whether or not the vehicle speed is less than 10 Km/h. If the answer to this question is "yes", then the EGR ratio is set at the point 206 to 0%. If the determination at the point 208 is "no", then at the point 210, the computer selects, from the EGR-ratio table stored in the first memory section 112 for the engine being in full engine operation, a signal having a value indicative of optimum EGR ratio based upon the instantaneous values of both of fuel supply to each cylinder and engine speed, and the program proceeds to a step at the point 222, this step being discussed hereinafter.

If the determination at the point 202 is "no", then the engine is operating on only the cylinders A, B and C and the program proceeds to a determination at the point 214. This determination is whether or not the idle switch is ON. If the idle switch is ON, then the EGR ratio is set at the point 216 to 0%. If the determination at the point 208 is "no", then at the point 220, the computer selects, from the EGR-ratio table stored in the second memory section 114 for the engine being in split engine operation, a signal having a value indicative of optimum EGR ratio based upon the instantaneous values of both of fuel supply to each cylinder and engine speed, and the program proceeds to the point 222 at which the calculated EGR ratio value is corrected for engine-coolant temperature and battery voltage. At the point 224, the corrected EGR-ratio value is outputted.

Figure 12:
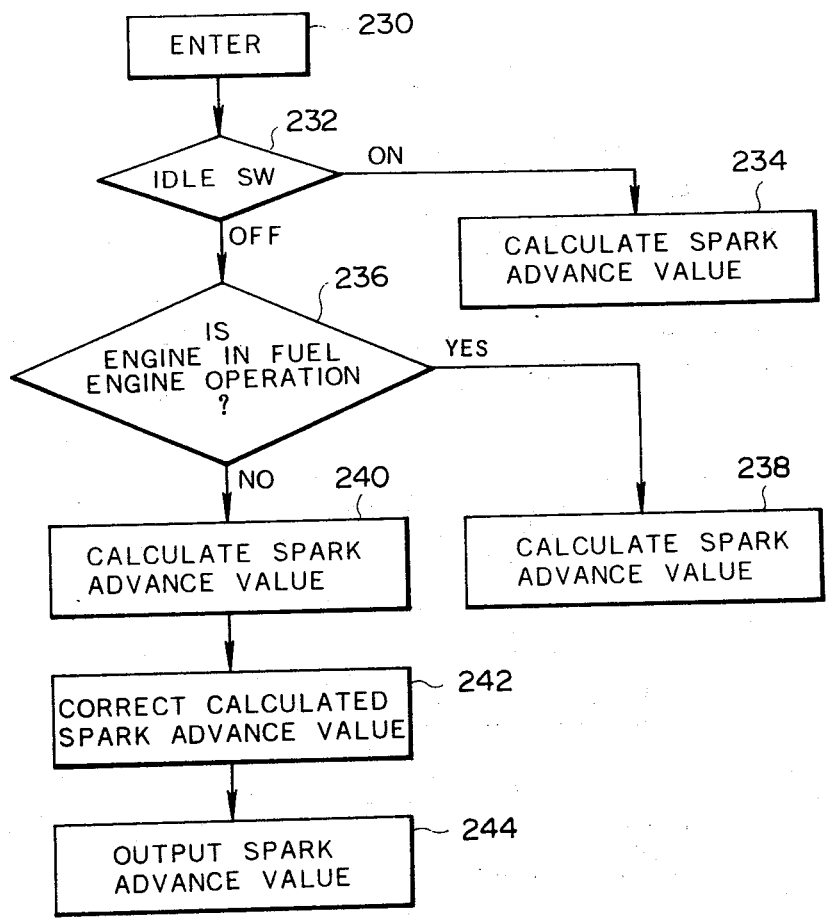
FIG. 12 is a flow diagram illustrating the programming of the digital computer as it is used to control the spark advance for the engine.

FIG. 12 is a flow diagram for the digital computer as programmed for the arithmetic calculation of spark advance. At the point 230 in FIG. 12, the computer program is entered. At the point 232, a determination is made as to whether the idle switch is ON. If the idle switch is ON, then the program proceeds to a point 234 at which the computer selects, from a table, a signal having a value indicative of optimum advance angle for the engine being idling. If the idle switch is OFF, then at the point 236, another determination is made as to whether the engine is in full engine operation. If the answer to this question is "yes", then the engine is operating on all of the cylinders and the program proceeds to a point 238 at which the computer selects, from the spark-advance table stored in the first memory section 112 for the engine being in full engine operation, a signal having a value indicative of optimum spark advance based upon the instantaneous values of both of fuel supply to each cylinder and engine speed, and the program proceeds to a step at the point 242, this step being discussed hereinafter. If the determination at the point 236 is "no", then the engine is operating on only the cylinders A, B and C and the program proceeds to a point 240 at which the computer selects, from the spark-advance table stored in the second memory 114 for the engine being in split engine operation, a signal having a value indicative of optimum spark advance based upon the instantaneous values of both of fuel supply to each cylinder and engine speed. Following this, at the point 242, the calculated EGR ratio value is corrected for engine-coolant temperature and other parameters. At the point 244, the corrected spark advance value is outputted.

While the present invention has been described in connection with specific embodiments thereof, it is evident that many alternatives, modifications and variations will be apparent to those skilled in the art. Accordingly, it is intended to embrace all alternatives, modifications and variations that fall within the spirit and broad scope of the appended claims.

What is claimed is:

1. An internal combustion engine comprising:
   (a) first and second cylinder units each including at least one cylinder;
   (b) an induction passage having therein a throttle valve, said induction passage being divided downstream of said throttle valve into first and second intake passages respectively communicating with said first and second cylinder units, said second intake passage having a stop valve near its entrance;
   (c) an exhaust passage;
   (d) an EGR passage connected from said exhaust passage to said induction passage downstream of said throttle valve, said EGR passage having therein an EGR valve whose position determines the flow area for exhaust gases through said EGR passage;
   (e) a control unit for closing said stop valve and disabling said second cylinder unit to shift said engine from full engine operation to split engine operation when the engine load falls below a predetermined value, said control unit comprising a computer responsive to signals indicative of engine speed and engine load, said computer including:
   memory means having first and second tables, said first table storing signals with values indicative of EGR ratio as functions of engine load and engine speed for said engine being in full engine operation, said second table storing signals with values indicative of EGR ratio as functions of engine load and engine speed for said engine being in split engine operation;
   said computer being operable to select a signal having a value indicative of EGR ratio corresponding with the conditions of engine load and engine speed from said first table when said engine is in full engine operation or from said second table when said engine is in split engine operation; and means responsive to the selected signal having a value indicative of EGR ratio for controlling the position of said EGR valve.

2. The internal combustion engine of claim 1, wherein said computer includes:

memory means having third and fourth tables, said third table storing signals with values indicative of spark advance as functions of engine load and engine speed for said engine being in full engine operation, said fourth table storing signals with values indicative of spark advance as functions of engine load and engine speed for said engine being in split engine operation;

said computer being operable to select a signal having a value indicative of spark advance corresponding with the conditions of engine load and engine speed from said third table when said engine is in full engine operation or from said fourth table when said engine is in split engine operation; and means responsive to the selected signal having a value indicative of spark advance for controlling the occurrence times of sparking for each cylinder of the engine.

3. The internal combustion engine of claim 1, wherein said computer is operable to set the EGR ratio to zero percent when said engine is idling.

4. The internal combustion engine of claim 1 wherein said computer is operable to correct the selected signal for at least one engine operating parameter.

5. The internal combustion engine of claim 1 which further comprises means for introducing fresh air into said second intake passage downstream of said stop valve only when the engine is in split engine operation, thereby minimizing pumping losses in disabled cylinders.

6. The internal combustion engine of claim 1 which further comprises means for recirculating exhaust gases from said exhaust passage into said second intake passage downstream of said stop valve only when the engine is in split engine operation, thereby minimizing pumping losses in disabled cylinders.

7. The internal combustion engine of claim 2, wherein said computer is operable to correct the selected signal for at least one engine operating parameter.

8. The internal combustion engine of claim 2, which further comprises means for introducing fresh air into said second intake passage downstream of said stop valve only when the engine is in split engine operation, thereby minimizing pumping losses in disabled cylinders.

9. The internal combustion engine of claim 2, which further comprises means for recirculating exhaust gases from said exhaust passage into said second intake passage downstream of said stop valve only when the engine is in split engine operation, thereby minimizing pumping losses in disabled cylinders.

* * * * *